Nov. 15, 1960 W. A. MALTHANER 2,960,571

SIGNAL DELAY SYSTEM

Filed Dec. 31, 1957 2 Sheets-Sheet 1

INVENTOR
W. A. MALTHANER
BY Kenneth B. Hamlin
ATTORNEY

Nov. 15, 1960 W. A. MALTHANER 2,960,571

SIGNAL DELAY SYSTEM

Filed Dec. 31, 1957 2 Sheets-Sheet 2

INVENTOR
W. A. MALTHANER
BY Kenneth B. Hamlin
ATTORNEY

United States Patent Office 2,960,571

Patented Nov. 15, 1960

2,960,571

SIGNAL DELAY SYSTEM

William A. Malthaner, New Providence, N.J., assignor to Bell Telephone Laboratories, Incorporated, New York, N.Y., a corporation of New York Filed Dec. 31, 1957, Ser. No. 706,358

16 Claims. (Cl. 178—69)

This invention relates to signal transmission systems and more particularly to a controllable delay element for such systems to compensate for fluctuations and variations in transmission propagation characteristics.

Incident to the development of improved communication systems there has evolved the method of data transmission by means of pulse code modulated signals. In accordance with this method, the instantaneous amplitude of the information signal that is to be transmitted is sampled in time and encoded as a pattern of binary pulse signals. The individual, pulse-no pulse signals of each pattern are transmitted in sequence as a time slot code. At the point of destination the intelligence is extracted by the recognition of the pattern of pulses in each time slot. Compensation for signal attenuation along the transmission path may be provided by regenerative repeaters in the form of externally-timed, self-timed, or even non-timed amplifiers. In order, however, most fully to exploit the relative freedom from transmission impairment by noise and other imperfections in the transmission medium which is made possible by the encodement of the intelligence in binary form, the regenerative amplifiers should retime as well as reshape and reamplify the incident pulses. In systems of any appreciable size complete retiming of all remote repeaters may not be practical due to the difficulty of supplying each such remote repeater with a periodic retiming wave from a centrally located master clock.

The use of self-timed repeaters, however, introduces timing deviations in the regenerated signal pulses that are dependent upon the regeneration characteristics of the repeaters as well as upon the amplitude and phase variations of the incident signal waveform. The regenerated signal pulse train therefore contains both the fixed and random timing deviations due to the repeaters and, in addition, timing deviations caused by changes in the propagation characteristics of the transmission medium with temperature and other ambient conditions. Where interconnections among a multiplicity of such transmission media are to be made, it becomes apparent that regardless of the nature of the cause, compensation for variations in transmission delay must be made, or the variations stabilized, for efficient operation. One method that has been used in the past is the insertion of a fixed delay pad in each transmission line to compensate for the fixed differences in transmission delay times among lines of differing length. However, in pulse code modulation systems employing time division switching among a plurality of signal channels, each of which is subject to ambient conditions that affect transmission delay time, it is necessary to more closely control the system delays than is possible by such fixed delay pads so that signals will be presented to succeeding circuits in strict time relationship.

Accordingly, it is an object of the present invention to effect an improvement in pulse signal transmission systems.

It is another object of the present invention to control the amount of signal delay in data transmission systems.

It is another object of the present invention to automatically stabilize signal delay in such systems.

Among the random timing deviations appearing in the regenerated signal pulse train characteristic of the above-described transmission systems employing self-timed repeaters is a bit-to-bit variation in pulse phase known as pulse time jitter. This pulse time jitter is superimposed upon the other variations in transmission system propagation characteristics having longer periodicity and, when transmitted to the inputs of succeeding circuits in the system, tends to degrade the performance of such circuits that are designed to accommodate only fixed or at most slow and consistent variations in pulse phase. Moreover, attempting to retime such pulses in accordance with a retiming waveform supplied by a "master clock" without regard to the slow and consistent variation in the mean phase of the incoming signals with respect to the phase of the "master clock" may result in the needless loss of such signals.

It is accordingly a further object of the present invention to reduce the effects of pulse time jitter in pulse signal transmission systems.

It is a still further object of the present invention to facilitate the controllable delay of pulses containing random phase deviations from their mean repetition rate.

The above-mentioned and other objects of the present invention are attained in illustrative embodiments thereof wherein signal pulses arriving over a transmission path of variable propagation characteristics are applied to a delay line of controllable effective length and upon emerging therefrom the delayed signal pulses are compared in phase with pulses from a reference pulse source in an error detecting device to develop an error signal proportional to the detected phase difference, and wherein the error signal so developed is utilized to adjust the effective length of the delay line to eliminate the phase difference.

Further, in accordance with the present invention, the effective lengths of the main and the auxiliary delay line are jointly controlled by a servomechanism deriving its actuating signal from the phase difference between signal pulses emerging from the main delay line and reference pulses supplied by a reference pulse source, and wherein the reference pulses, as controlled in the auxiliary delay line, regulate the admission of signal pulses into the main delay line from the signal pulse source so that signal pulses emerging from the main delay line will be in phase with the reference pulses.

Accordingly, a feature of the present invention is a delay element in a signal tranmission system, which delay element is automatically controlled so as to maintain a constant signal transmission time in the system.

Another feature of the present invention is a variable delay element automatically adjusted in accordance with the delay element output signal.

It is another feature of the present invention that the admission of signals to a signal delay element is controlled by a retiming waveform derived from the output of the signal delay element.

It is a further feature of the present invention that the phase difference between delay element output signals and signals of reference phase varies the effective length of the signal delay element.

The foregoing and other objects and features of the present invention will be more readily understood from the following description of illustrative embodiments thereof when read with reference to the accompanying drawing, in which.

Figure 1:
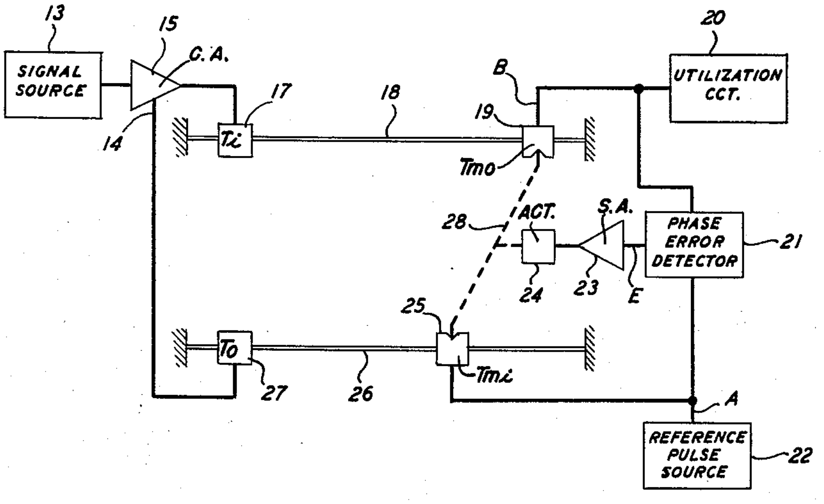
Fig. 1 shows in schematic form an illustrative embodiment of an automatically controlled delay line in accordance with the principles of the invention.

Referring now to Fig. 1, electrical signal pulses from source 13, which source may comprise a signal transmission system exhibiting the above-referred to variable propagation characteristics, are applied through controlled amplifier 15, which controlled amplifier is presently assumed to be in a state providing an uninhibited signal path, to the input transducer 17 of delay line 18. The subscript notations $T_i$, $T_{mo}$, $T_{mi}$ and $T_o$ at transducers 18, 19, 25 and 27 designate respectively an input transducer, a movable output transducer, a movable input transducer and a stationary output transducer. Delay line 18 advantageously may be in the form of any of the well-known magnetostrictive rod, wire or tube elements. The electrical signals applied to transducer 17 set up the well-known acoustic propagation of impulses in delay line 18, which impulses, upon reaching movable output transducer 19, are therein converted back into electrical signal pulses. The length of time transpiring between the introduction of electrical signal pulses at 17 and their reappearance at point B, which is the output of transducer 19, is the utilized time delay of the delay line 18 and is proportional to the length of delay line 18 between transducers 17 and 19. The delayed electrical signals at B are delivered to the utilization circuit 20 and to one input of phase error detector 21 to be hereinafter more fully described. A reference pulse source or "master clock" shown at 22 is connected to the other input of phase error detector 21. Output signals indicated at E from phase error detector 21 are amplified by servo amplifier 23 and are applied to actuator 24. Actuator 24 drives output transducer 19 along delay line 18 through mechanical linkage 28 indicated by the dotted lines.

Figure 3:
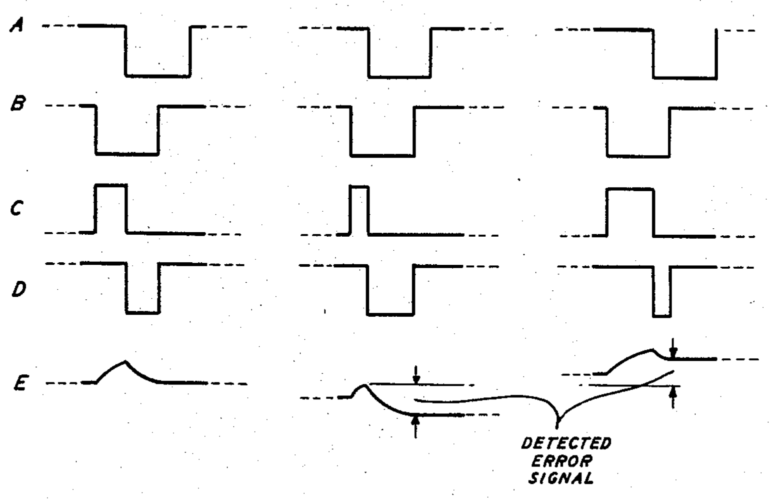
Fig. 3 shows the waveforms describing the operation of the circuit of Fig. 2.

In operation, the above-described portion of the circuit of Fig. 1 functions as follows. The reference pulse source 22 supplies a continuous train of accurately timed pulses having a repetition frequency substantially equal to the nominal repetition frequency of source 13. In Fig. 3 one pulse of the continuous train of pulses supplied by reference pulse source 22 is shown in each of the three columns at A to illustrate three different phase relationships with the other waveforms at B, C, D and E. Shown at B of Fig. 3 are three delayed signal pulses appearing at output transducer 19 for three different phase conditions. In the first column the delayed signal pulse shown at B is of phase such that the start of the reference pulse occurs at the center of the delayed signal pulse. In the second column, the delayed signal pulse shown at B is of phase such that the start of the reference pulse occurs during the first half of the delayed signal pulse and in the third column the phase is such that the reference pulse occurs during the second half of the delayed signal pulse shown at B. The three pulse configurations illustrate respectively the condition of correct phasing between the delayed signal pulse and the reference pulse (corresponding to a properly adjusted separation between transducers 17 and 19), a phase condition corresponding to too much transducer separation, and a phase condition corresponding to insufficient transducer separation. In order to correct the distance between transducers 17 and 19 to achieve the desired correspondence of reference and delayed signal pulses shown respectively at A and B in the first column of Fig. 3, the actuator 24 of Fig. 1 must receive a signal indicative of the magnitude and of the direction in which the correction is to be applied.

Figure 2:
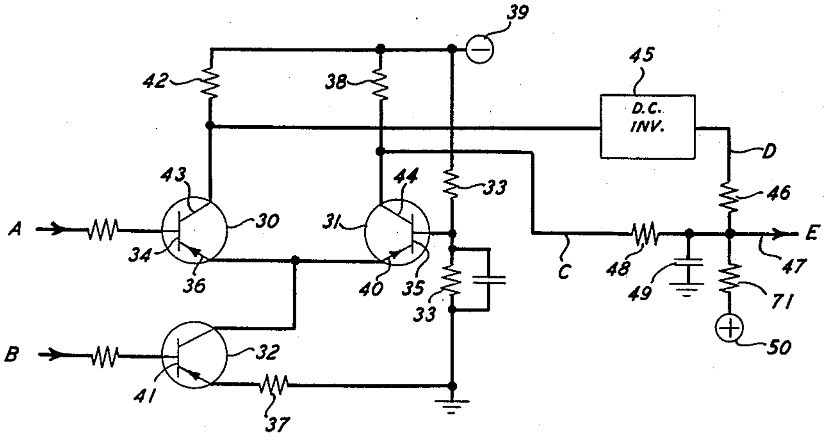
Fig. 2 shows in schematic form an illustrative embodiment of a signal-gated phase error detector which may be used as the phase error detector shown in Fig. 1.

The phase error detector circuit shown in Fig. 2 performs this function. In the left-hand portion of Fig. 2 are shown transistors 30 and 32 to the base terminals 34 and 41 of which the signals at A and B are respectively coupled. Points A, B and E of Fig. 2 correspond to similarly labeled points of Fig. 1 and to the waveforms of Fig. 3. The base 35 of a third transistor 31 is connected to the voltage divider 33 at a voltage point thereon which is preset at a value of bias potential equal to the average voltage level of the reference pulses applied at A and coupled to the base 34 of transistor 30. In the intervals during which no reference pulses are applied to the base 34 of transistor 30, a current path from ground through resistor 37, transistor 32, transistor 31, resistor 38 to source 39 is enabled by the application of delayed signal pulses shown at B to the base 41 of transistor 32. During the intervals that each of the reference pulses shown at A are applied to the base 34 of transistor 30, the current path enabled by the application of each of the delayed signal pulses to transistor base 41 comprises ground, resistor 37, transistor 32, transistor 30, resistor 42 and source 39. During the intervals when no delayed signal pulses are applied to the base 41 of transistor 32, no current path from ground to source 39 is provided and it is from this aspect that the circuit of Fig. 2 may be referred to as "signal-gated." Signals appearing at collector 43 of transistor 30 are inverted by unity gain direct-current inverter 45, i.e., a change in potential at collector 43 from minus $x$ volts to minus $y$ volts is inverted to appear at point D as a change in potential from minus $y$ volts to minus $x$ volts, and are coupled through isolating and summing impedance 46 to output terminal 47, and signals appearing at collector 44 of transistor 31 are coupled through isolating and summing impedance 48 to output terminal 47. The voltages appearing at C and D are summed by impedances 48 and 46, respectively, integrated upon capacitor 49 to yield the output voltage at E. Positive potential source 50 and resistor 71 establish the rest, i.e., no error, potential of terminal 47 at approximately ground potential.

Under the conditions shown in the first column of Fig. 3, the first half of the signal-gated current flows to collector 44 of transistor 31 and the second half of the signal-gated current flows to collector 43 of transistor 30. Since both the first half and second half signal-gated currents are of equal magnitude and duration, the potential developed across resistor 38 which tends to charge capacitor 49 to a more positive potential, as shown in the first column of Fig. 3 at C, will be counteracted by the output of unity gain direct-current inverter 45 which inverts the potential developed across resistor 42 and tends to charge capacitor 49 to a more negative potential, as shown in the first column of Figure 3 at D. No net potential is therefore developed on capacitor 49, as shown in the first column of Fig. 3 at E. In the second column of Fig. 3, the conditions shown are such that current flows through transistor 31 for only a short time before being diverted to transistor 30 by the application of the reference pulse to base 34. Thus, as seen in the second column of Fig. 3 at C, there is only a brief tendency to charge capacitor 49 more positively which is overcome by application of the negative potential from inverter 45 for an appreciably greater period, as shown in the second column of Fig. 3 at D, resulting in a net negative potential being established on capacitor 49 as shown in the second column at E. Similarly, the third column of Fig. 3 shows the conditions obtaining when current flows through transistor 31 for a longer portion of the signal pulse before being diverted to transistor 30 by the application of the reference pulse to base 34. The positive net voltage appearing on capacitor 49 is shown in the third column at E. It is seen therefore that the circuit of Fig. 2 will produce a negative net output voltage when the start of the reference signal pulse occurs during the first half portion of the signal pulse, a positive net output voltage when the start of the reference pulse occurs during the second half portion of the signal pulse, and zero net output voltage when the start of the reference pulse occurs at the central portion of the signal pulse. The device shown in Fig. 2 therefore satisfies the requirement for the phase error detector 21 of Fig. 1 in yielding an output, or error signal, whose magnitude and sign is determined by the phase error existing between the delayed signal pulses at B and the reference or clock pulses at A of Fig. 1.

The actuator 24 of Fig. 1 may advantageously comprise any of the varieties of reversible servo motors well known in the art and amplifier 23 accordingly indicates a suitably designed companion amplifier for powering actuator 24 in response to the output signal of phase error detector 21.

Figure 4:
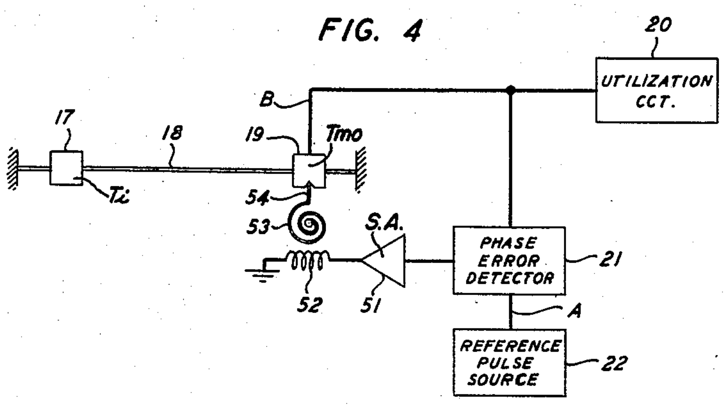
Fig. 4 shows a portion of Fig. 1 and, in schematic form, an illustrative embodiment of the actuator element thereof.

Alternatively, a simple actuator mechanism, schematically shown in Fig. 4, for moving output transducer 19, may be constructed using a bimetallic strip 53 which is caused to expand in response to the heating effect produced in heater 52 by amplifier 51. In this case, amplifier 51 would supply a quiescent heating current even when the delayed signal pulses where in correct phase relationship with the reference pulses so that an increase in heating current causing an expansion of strip 53 would move the transducer 19 through linkage 54 to the left and a decreased heating current causing a contraction of strip 53 would move transducer 19 to the right. Amplifier 51 may be any of the well-known vacuum tube, magnetic or transistor devices which would increase or decrease its output current in accordance with the magnitude and polarity of its input signal as provided by phase error detector 21.

Figure 5:
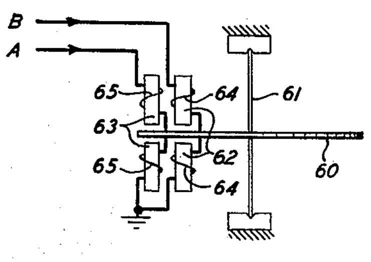
Fig. 5 shows in schematic form an illustrative embodiment of an alternative element combining the functions of the phase detector and actuator elements shown in Figs. 2 and 4.

As a further alternative to the actuator devices and phase error detector above suggested there is illustrated schematically in Fig. 5 an eddy-current disc 60 suitably supported by shaft 61. Arranged along the outer periphery of disc 60 are polepieces 62 and 63 carrying windings 64 and 65, respectively. In accordance with the well-known principles of operation of eddy-current disc devices, the torque on shaft 61 is directly proportional in both magnitude and direction to the relative phase relationship of the currents in windings 64 and 65. In this configuration, winding 64 is excited by the delayed signal pulses indicated by B in Figs. 1 and 5 from the delay line output 19 and winding 65 is supplied by the pulses indicated by A in Figs. 1 and 5 from the master clock 22. For this reason, the device shown in Fig. 5, when connected by suitable linkage as schematically illustrated at 28 of Fig. 1, performs the function of phase error detector 21 as well as actuator 24. Of course, by using a cylindrical rotor instead of the disc shown at 60, together with multiple pairs of windings, the device of Fig. 5 may be realized in induction motor form.

Referring again to Fig. 1, it has so far been assumed that there was no pulse time jitter present in the signals from signal source 13 applied through amplifier 15 to transducer 17. However, in the more commonly encountered transmission systems employing the self-timed regenerative amplifiers priorly referred to, pulse time jitter may be present to an appreciable degree and the application of such signals to that portion of the circuit element of Fig. 1 heretofore described will cause the error detector 21 to respond to the instantaneous phase deviations of the incoming superimposed jitter signal necessitating the addition of higher frequency filtering in the servo amplifier which will result in slowing of the corrective action of the servo arrangement. The removal of this jitter variation is accomplished in accordance with one aspect of the present invention at amplifier 15 so that only firmly "clocked" pulses are admitted to transducer 17. In accordance with this aspect, amplifier 15 is controlled via input 14 such that signals above a preset minimum threshold amplitude will be gated through to input transducer 17 only during the occurrence of an enabling signal on input 14. Amplifier 15 may advantageously be any one of the well-known types of controlled pulse amplifiers. The enabling signal for input 14 of amplifier 15 is supplied by a timing waveform having the same nominal pulse repetition rate as source 13 and which waveform is in phase with the mean phase of the arriving signals. Although master clock 22 is of correct pulse repetition frequency, its available phases will not in general correspond to that of the arriving signals since the required phase will vary as the delay in signal source 13 varies. An auxiliary timing waveform with a corresponding variation is therefore required. Provision for obtaining this auxiliary timing waveform is shown in Fig. 1 by the elements comprising master clock 22, input transducer 25, delay element 26, output transducer 27 and lead 14 connected to amplifier 15. Delay element 26 is advantageously of similar construction to delay element 18. The length of element 26 included between transducers 25 and 27 is adjusted to sufficiently delay the master clock output pulses to correspond with the mean phase of the arriving signals. Input transducer 25 is movable with respect to output transducer 27 and is positioned by linkage 28 jointly with output transducer 19 to continuously provide the proper phase of timing waveform for amplifier 15 in correspondence with the variation in the length of element 18 included between transducers 17 and 19. Thus, as the position of transducer 19 is varied to compensate for changes in the propagation characteristics in the transmission line, whose effects are included in the output of source 13, the phase of the auxiliary timing waveform supplied to input 14 of amplifier 15 is maintained in correspondence with the changes in mean phase of arriving signals.

It is to be understood that the above-described arrangements are illustrative of the application of the principles of the invention. Numerous other arrangements may be devised by those skilled in the art without departing from the spirit and scope of the invention.

What is claimed is:

1. A variable pulse delay system comprising first and second adjustable delay elements, a source of signal pulses, means coupling said signal pulse source to an input of said first delay element, a reference phase pulse source directly coupled to an input of said second delay element, means for adjusting the length of delay in said first and second delay elements, means for coupling said reference pulse source and the output of said first delay element to said delay adjusting means, and means for applying the output of said second delay element to said signal pulse source coupling means to control the application of signal pulses to said first delay element.

2. A variable pulse delay system in accordance with claim 1 wherein said delay adjusting means comprises phase detector means coupled between said first element output and said source of reference-phase pulses for producing an error signal of one polarity in response to a phase difference therebetween greater than a predetermined amount and an error signal of opposite polarity in response to a phase difference therebetween less than said predetermined amount, and actuator means controlled by said error signal for adjusting said first and said second delay element in one sense in response to said error signal of one polarity and in the opposite sense in response to said error signal of opposite polarity.

3. The combination defined in claim 2 wherein said adjustable signal delay element comprises a linearly-disposed magnetostrictive member having input and output transducers and means for moving one of said transducers with respect to the other.

4. The combination defined in claim 3 wherein said actuator means comprises an electromechanical linkage for moving said output transducer relative to said input transducer.

5. A controllable pulse delay system comprising a source of signal pulses, a first adjustable pulse delay element having an input and an output, gating means operable to couple said signal pulses to said input, a source of reference pulses, a second adjustable pulse delay element having an input and output, means connected to said first delay element output and said source of reference pulses for jointly adjusting both said first and said second delay elements in accordance with the difference in phase of said reference pulses and the pulses at said first delay element output, means connecting said source of reference pulses to said second delay element input, and means connecting said second delay element output to said gating means to operate said gating means.

6. A controllable pulse delay system comprising a source of signal pulses, a first and a second adjustable delay element each having an input and an output physically spaced from said input, gating means connected between said signal pulse source and said first delay element input, a source of reference pulses, means connected to said first delay element output and said source of reference pulses for jointly adjusting the spacing between said first and second delay element inputs and outputs in accordance with the difference in phase of said reference pulses and the pulses at said first delay element output, means connecting said source of reference pulses to said second delay element input, and means connecting said second delay element output to gating means.

7. A controllable pulse delay system in accordance with claim 6 wherein said first and second delay elements are delay lines.

8. A controllable pulse delay system in accordance with claim 7 wherein said delay lines are magnetostrictive delay lines.

9. In a pulse signal transmission system the combination comprising a source of signal pulses, a pulse delay element, gate means coupling said signal pulse source to an input of said delay means, a source of reference pulses, means coupled to said reference pulse source and to the output of said pulse delay element for adjusting the length of delay in said pulse delay element, and means directly coupled to said reference pulse source for selectively enabling said gate means to apply signal pulses to said delay element.

10. In a pulse signal transmission system according to claim 9, the combination wherein said means for selectively enabling said gate means comprises variable delay means, said delay adjusting means being connected to adjust the effective length of said variable delay means.

11. The combination defined in claim 10 wherein said delay means comprises a linearly-disposed magnetostrictive member having input and output transducers and wherein said means for varying the effective length of said delay means comprises means for moving one of said transducers with respect to the other.

12. The combination defined in claim 11 wherein said means connected between said output and said source of reference pulses comprises pulse phase error detecting means and thermal actuator means controlled by said error detecting means to move one of said transducers with respect to the other.

13. The combination defined in claim 11 wherein said means connected between said output and said source of reference pulses comprises an eddy-current rotor device having one of its activating windings supplied by said output pulses and another of its windings supplied by said reference pulses and wherein the resultant motion of said rotor adjusts the position of said output transducer relative to said input transducer.

14. In a pulse signal transmission system the combination comprising a source of signal pulses, a controllable pulse delay element having an input and an output for delivering output pulses corresponding to the pulses applied at its input after an adjustable delay interval, gate means for selectively coupling said signal pulses to said delay element input, a source of reference pulses, variable delay means for coupling said reference pulses to said gate means, and means connected between said output and said source of reference pulses for simultaneously varying the effective length of said controllable pulse delay element and of said variable delay means.

15. A pulse signal transmission system comprising a source of selectively gated pulses, a continuously adjustable pulse delay element connected at its input to said source of gated pulses and producing at its output pulses corresponding to said gated pulses after an adjustable delay time, a source of reference pulses, transistor phase error detector means connected to said delay element output and to said source of reference pulses for producing an error signal of one polarity when the delay element output pulses and the reference pulses occur simultaneously for less than half the duration of each of the delay element output pulses and an error signal of opposite polarity when said delay element output pulses and said reference pulses occur simultaneously for more than half the duration of each of said delay element output pulses, and means responsive to said error signal for controlling said source of selectively gated pulses.

16. A pulse signal transmission system in accordance with claim 15 wherein said phase error detector means comprises a first transistor having base, emitter and collector electrodes, means coupling said first transistor base electrode to said source of reference pulses, a second transistor having base, emitter and collector electrodes, means coupling said second transistor base electrode to a source of bias potential, a third transistor having base, emitter and collector electrodes, means coupling said third transistor base electrode to said delay element output, means coupling said third transistor collector electrode to the emitter electrodes of said first and said second transistors, pulse inverting means coupling said first transistor collector electrode and said phase detector output, means coupling said second transistor collector electrode and said phase detector output, means for applying an operating potential between said third transistor emitter electrode and the collector electrode of said first and said second transistors, and capacitor means connected between said phase detector output and said third transistor emitter electrode.

References Cited in the file of this patent

UNITED STATES PATENTS

| | | |
|---|---|---|
| 2,564,588 | Wendt | Aug. 14, 1951 |
| 2,694,748 | Johnson | Nov. 16, 1954 |
| 2,695,331 | Johnson | Nov. 23, 1954 |
| 2,828,478 | Johnson | Mar. 25, 1958 |